May 6, 1958
C. F. ALDRIDGE ET AL
2,833,149
DIAL TYPE THERMOMETER
Filed Sept. 25, 1952
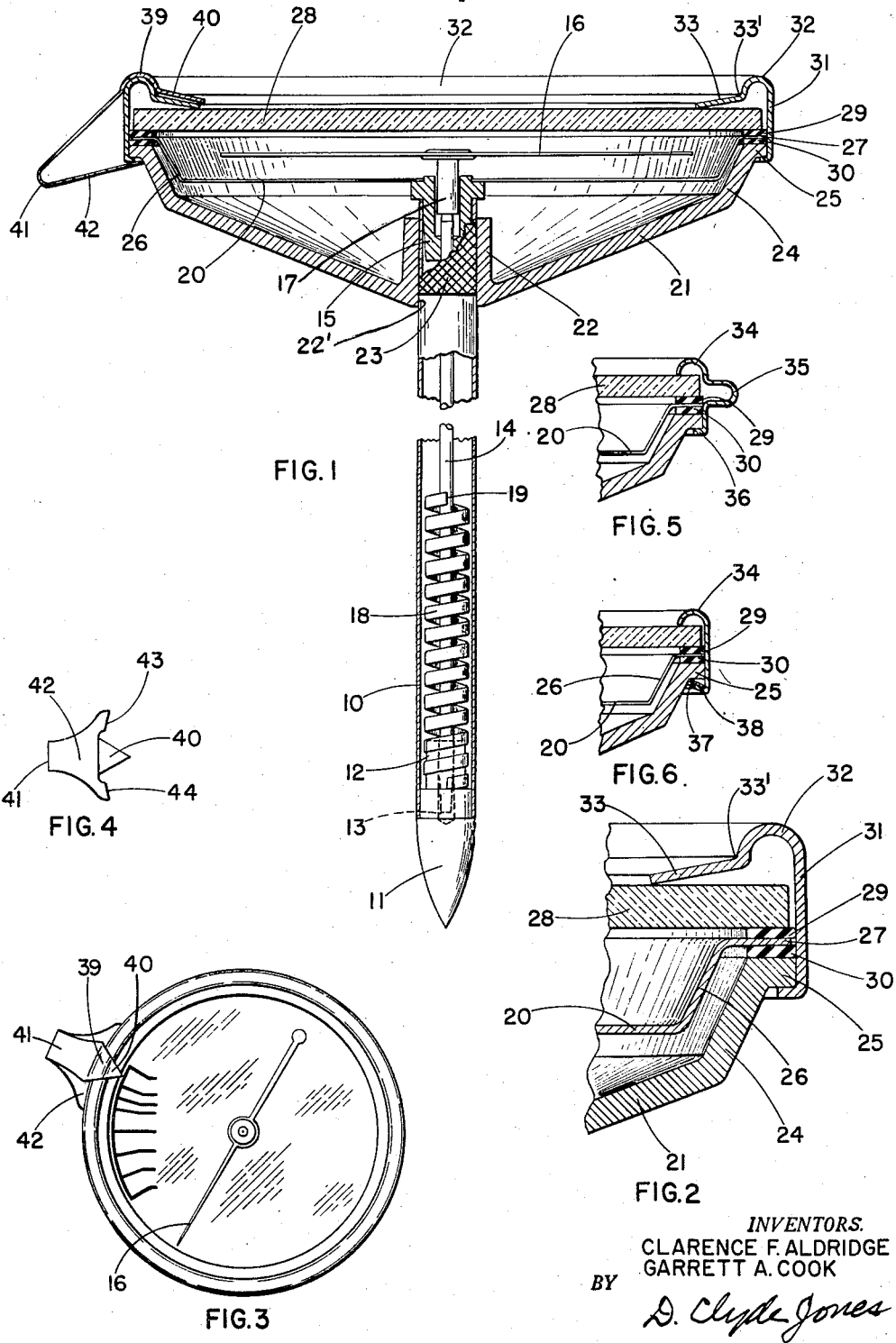
INVENTORS.
CLARENCE F. ALDRIDGE
GARRETT A. COOK
BY
D. Clyde Jones

United States Patent Office 2,833,149
Patented May 6, 1958

2,833,149
DIAL TYPE THERMOMETER

Clarence F. Aldridge, Fairport, and Garrett A. Cook, Rochester, N. Y., assignors to Taylor Instrument Companies, Rochester, N. Y., a corporation of New York Application September 25, 1952, Serial No. 311,442

2 Claims. (Cl. 73—352)

This invention generally relates to dial type indicating gages and more particularly to dial type domestic science thermometers having an elongated stem portion provided with a pointed end for piercing materials to be tested, such as roasts of meat.

The usual thermometer of this type comprises a dial case mounted adjacent the end of the metallic piercing stem opposite the pointed end thereof and provided with a crystal or glass plate closure means sealed to the periphery or edge of the case by gaskets and some sort of crystal retaining bezel which is commonly press fitted over the peripheral edge of the case. Since the gaskets employed must of necessity be made of high temperature resistant material to withstand relatively high oven temperatures, these gaskets have always been practically non-resistant inasmuch as the combined characteristics of both high temperature resistance and good resilience in a single gasket material has been unknown until quite recently. Consequently, the so called peripheral edge case seal has in no sense amounted to an absolutely tight or hermetic seal. Thus, when exposed to atmospheres containing appreciable moisture or when submerged in water in the course of cleaning after use, moisture or water penetrates to the interior of the dial case followed by obviously harmful results. At first glance it would seem that the remedy for this defect would be a hermetic seal, assuming the availability of a suitable gasket material. However, such a remedy alone creates another problem in that water, which might accidentally enter the instrument at some other point in the case or stem portion, when subjected to ordinary cooking temperatures of approximately 400° F., vaporizes into steam and generates pressures within the hermetically sealed case in excess of 200 pounds per square inch. Inasmuch as it has been determined that the ordinary glass crystals employed would fail or break when subjected to an internal case pressure of 65 pounds per square inch, pressures equal to or in excess of this value obviously cannot be tolerated.

As is well known, the usual domestic science dial type thermometer has incorporated in the stem portion thereof a bimetallic temperature sensing element connected to and wound about a torque shaft, upon the case or dial end of which is mounted an indicating needle. Upon change in temperature, the bimetallic element not only causes rotation of the torque shaft and needle but also causes a slight axial movement of these elements necessitating the allowance of considerable clearance between the inscribed dial of the instrument and the closure crystal between which the rotatable needle is positioned. To obtain this clearance an extra spacer member has been employed between the crystal and the inscribed dial of the case adjacent the peripheral edge thereof. Aside from the fact that the peripheral edge portion of the case is thereby made thicker or wider in an axial direction than desirable to accommodate the spacer, the cost of the instrument is unnecessarily high because of the objectionable additional spacer element and could be reduced provided the necessity for this member was eliminated.

An additional objection to existing dial type roast meat thermometers resides in the difficulty experienced by the user in properly reading the dial graduations in the relatively dark confines of an oven and as a consequence the indicating needle commonly advances above or beyond the desired maximum temperature to which the meat is to be subjected before discovery.

Finally, in an effort to provide a tight seal where the dial case is mounted on the stem portion, the joint structure therebetween has become costly or expensive because of specially fabricated elements employed therein. Nevertheless, such joints heretofore known to applicants are not tight to the extent of amounting to a hermetic seal.

It is therefore an object of this invention to provide a hermetically sealed dial type thermometer.

It is also an object of this invention to provide a dial type roast meat thermometer which is not only hermetically sealed but which incorporates safety or pressure release means therein to prevent explosions or rupture of the glass crystal or transparent dial closure means in the event of excessive pressure within the dial case.

It is a further object of this invention to provide a dial type thermometer in connection with which the conventional dial-crystal spacer has been eliminated but at the same time providing an instrument having adequate clearance for axial movement of the instrument indicating needle between these two members.

It is an additional object of this invention to provide a dial type thermometer having a clearly observable and easily adjustable index pointer mounted on the dial case thereof and which may be preset opposite a predetermined temperature indicated or inscribed on the instrument dial whereby actual observation or locating of this temperature on the dial is avoided.

It is also an object of this invention to provide a simpler, less costly and better sealed joint between the dial case and the stem upon which it is mounted than the joints heretofore provided for dial type domestic science thermometers.

The invention will be better understood from the following description when taken in connection with the accompanying drawing and the scope of the invention will be pointed out in the appended claims.

In the drawing, Fig. 1 is an elevation view partly in section of a dial type domestic science thermometer embodying the several features of the invention; Fig. 2 is a cross sectional view illustrating an edge portion of the dial case shown in Fig. 1 and enlarged to better illustrate the hermetic seal and one embodiment of a pressure release means of the invention incorporated therein; Fig. 3 is a plan or top view of the dial case shown in Fig. 1 and illustrating a plan view of the index pointer of the invention mounted on the edge thereof; Fig. 4 is a bottom plan view of the pointer to better illustrate the portion thereof mounted adjacent the bottom surface of the dial case; Fig. 5 is a view similar to Fig. 2 illustrating a modification of the hermetic seal and pressure release means and Fig. 6 shows a third embodiment of the hermetic seal and pressure release means of the invention.

Referring now to Figure 1, particularly, of the drawing, the numeral 10 identifies a hollow or tubular stem of non-contaminating and corrosive resistant material such as chrome-nickel steel provided with a solid chrome-nickel steel pointed end 11 to facilitate the piercing of material, such as meat, to be tested. The solid pointed end 11 is brazed or otherwise suitably affixed to stem 10 and is provided with an integral solid portion 12 which projects a predetermined distance into tubular stem 10 and is of lesser diameter than the inside diameter thereof for a purpose to be pointed out hereinafter.

Portion 12 is provided with a drilled opening 13 which runs into portion 11 and serves as a bearing for one end of a torque shaft 14 which extends upwardly through the tubular stem 10 and is supported at the upper end thereof by a suitable bearing 15 press fitted into the upper end of the stem 10 as illustrated. An indicating needle 16 is suitably mounted on a hub 17 therefor which in turn is press fitted on to the upper end of shaft 14 so that as the shaft rotates the needle will also be rotated thereby. To rotate the shaft and needle, a temperature measuring or sensitive member is provided comprising a bimetallic element 18 coiled about shaft 14 with a portion adjacent an end thereof wound about and in good temperature transfer engagement with portion 12 of pointed end 11 as illustrated. This end adjacent portion of the bimetallic element is also spot welded or otherwise suitably fixed to portion 12 while the upper end thereof is fixed, as by spot welding, at 19 to torque shaft 14. Thus, upon exposure of pointed end 11 to a change in temperature, the temperature change will be transmitted by conduction through portion 12 to bimetallic element 18 which will thereby be caused to coil or uncoil, dependent upon the direction of the temperature change, and in turn cause rotation of shaft 14 and needle 16 mounted thereon. Of course, the temperature change will also be transmitted through stem 10 by convection to the bimetallic element 18. Indicating needle 16, together with an inscribed or graduated dial 20 are contained within an enclosed dial case mounted adjacent the end of tubular stem 10 opposite the pointed end thereof in accordance, generally speaking, with prior art practice. In fact, as thus far described, the instrument is substantially identical to conventional and well known dial type thermometers.

In accordance with the invention, however, the dial case comprises a die casted main body portion 21 extending transversely and outwardly from tubular stem 10 and including an integral hub portion 22 die casted about and in binding engagement with a knurled portion 23 formed about the outer surface of stem 10 adjacent the upper end thereof. Although the hub portion in engagement with the knurled portion is sufficient to provide a firm and tight joint, hub 22 also includes a portion 22' extending in an axial direction beyond knurled portion 23 and in engagement with the smoother outer surfaces of stem 10 adjacent thereto as shown, to insure against any axial movement of the dial relative to the stem. Main body portion 21 also includes a portion 24 extending outwardly and transverse thereto in a direction away from pointed end 11 of stem 10 which portion terminates in and defines the peripheral edge 25 of the main body of the case.

A distinguishing feature of the invention comprises the cup or dished shaped dial 20 having a graduated or inscribed portion containing a central aperture therein directly mounted on a flanged or shoulder portion of bearing 15 and having a wall portion 26 extending transverse to the graduated portion substantially parallel and adjacent to portion 24 of the dial case, as illustrated. Sloping wall 26 terminates in a portion 27 defining the peripheral edge of the dial positioned adjacent the peripheral edge portion 25 of the case. The dial case is provided with a closure plate 28 of a transparent, impervious material such as glass or a suitable plastic which is hermetically sealed to the main body portion of the case.

One element of the hermetic seal comprises gaskets 29 and 30 of high temperature resistant, low compression set material, such as silicone elastomer, positioned on opposite sides of the peripheral edge 27 of the dial as most clearly illustrated by Fig. 2. Of course, it will be understood that a single gasket of this material having a slot or notch extending radially from the inner edge thereof to accommodate the edge 27 of the dial may be substituted for gaskets 29 and 30. As another element of the hermetic seal a combination clamping and pressure release safety means is provided for compressing the gaskets and drawing the closure plate 28, dial edge 27 and case edge 25 into hermetic sealing engagement therewith. Generally speaking, the clamping and safety means comprises a bezel 30 preferably of metallic spring stock with an elastic limit above the maximum stress expected in service and having a portion fixedly engaged with any portion of case edge 25 in any suitable manner, such as the portion spun over into engagement with the side of edge 25 opposite the gasket engaging side thereof as illustrated, a portion about or enclosing the peripheral edges of the gaskets and plate and including a portion 32 formed or curved beyond and in clamping engagement with the flat side or face of plate 28 opposite the gasket engaging face thereof. More specifically, however, and as an important feature of the invention, the portion 32 of the edge enclosing portion comprises a reverse bend curved completely back upon itself and joined to a substantially flat lip portion 33 by a portion 33' curved in a direction opposite to the curvature of portion 32. The lip portion 33 extends transverse to the edge enclosing portion of the bezel or transversely from the double curved portion 32—33' thereof in a direction toward the center of and with the inner edge thereof in biasing engagement with plate 28 while, it should be noted, the flat portion 33 adjacent curved portion 33' is spaced from the plate. Thereby, a pressure release means has been incorporated in the bezel 31 to provide a combination clamping and safety means having such a configuration that the bezel will flex in one direction to allow movement of plate 28 and dial 20 relative to the gaskets to permit release of pressure within the case in excess of a predetermined value and will flex in the opposite direction to reestablish the hermetic seal when the pressure within the case drops below this predetermined value. Inasmuch as the material of gaskets 29 and 30 is not only high temperature resistant to withstand high oven temperatures but, in addition, has a low compression set characteristic, as well, the gaskets, once compressed in this manner, will provide an exceptionally tight hermetic seal which will retain its resilient sealing qualities against entrance of moisture or water through the edge of the case for the life of the instrument. On the other hand, however, the safety feature incorporated in the bezel, as previously pointed out, provides for release of pressures in excess of a predetermined value which otherwise would cause an explosion when subjected to oven temperatures as a result of water which might accidentally enter the instrument at some portion thereof other than at the peripheral case seal.

Like the main embodiment, the hermetic sealing and pressure release means of the Figures 5 and 6 modifications comprises a gasket or gaskets 29 and 30 and a bezel having a portion 34 formed over into clamping engagement with the face of plate 28 opposite the gasket engaging face thereof. However, in the case of the Fig. 5 embodiment, a corrugation 35 is provided in the bezel intermediate the formed over plate engaging portion 34 and a spun over case engaging portion 36 while in the case of the Fig. 6 embodiment the springing resilience is obtained primarily from a member 37 of spring material having the configuration of a transverse section of a conical surface. As illustrated, the inner edge of spring member 37 engages the surface of the peripheral edge 25 of the case opposite the gasket engaging surface thereof and the spring otherwise extends downwardly away from this side while the bezel is provided with a portion 38 formed over the outer edge of the spring member into clamping engagement with the side thereof opposite the side adjacent the case edge.

To eliminate the necessity of actually reading the dial graduations when the instrument is in the dark confines of an oven, an index pointer is provided as a further feature of the invention and comprises a portion 39 formed with a curvature approximately the same as the curvature of formed over portion 32 of the bezel and a portion 40 converging to a point. Pointed portion 40 may be of some distinctive color, such as red for example, to render it more easily observable. Curved portion 39 and portion 40 are joined by an outwardly extending handle portion 41, having a resilient or springing characteristic, to a portion 42 having a terminating edge with portions 43 and 44 of the same configuration or curvature as portion 24 of the dial case as better illustrated in Figure 4. When mounted on the bezel 31, with pointed portion 40 extending away from the bezel and overlying the lip portion 33 of the bezel and the closure plate 28 as shown, the resiliency of handle 41 will cause biasing of curved portion 39 and terminating edge portions 43 and 44 respectively into slidable engagement with formed over portion 32 and edge adjacent portion 24 of the dial case. Portion 42 and terminating edges 43 and 44 amount to a special feature of the index in that a force applied thereto and tending to move the index slidably and circularly around the edge of the case will not cause removal of the index therefrom because, it should be noted, portion 42 and edge portions 43 and 44 thereof extend a predetermined distance respectively beyond opposite edges of handle 41. On the other hand, the index may be conveniently removed from the case by exertion of an upward pressure on handle portion 41 although otherwise the biasing action will firmly maintain the index on the case edge as illustrated.

While we have, in accordance with the patent statutes, shown and described a particular embodiment of the invention and modification thereof, it will be obvious that changes and modifications can be made without departing from the invention in its broader aspects and we, therefore, aim in the appended claims to cover all such changes and modifications as fall within the true spirit and scope of the invention.

What we claim as new and desire to secure by Letters Patent of the United States is:

1. In a domestic science thermometer having a dial case containing an inscribed dial and indicating needle therein and a dial enclosure plate for said case of transparent, impervious material, a hermetic seal for said case comprising gaskets of high temperature resistant, low compression set material positioned between portions of said case and said plate adjacent the peripheral edges thereof, clamping and safety means for compressing said gaskets and drawing said plate and case into hermetic sealing engagement respectively therewith and to permit release of pressures within said case above a predetermined value comprising a bezel having a portion fixedly engaged with a portion of said peripheral edge of said case, a portion formed over into clamping engagement with the face of said plate opposite said gasket engaging face thereof and a portion intermediate said case engaging and formed over plate engaging portions defining a corrugation in said bezel.

2. In a domestic science thermometer having an inscribed dial and indicating needle enclosed by a dial enclosure plate of transparent, impervious material within a dial case having a peripheral rim portion defining a pair of substantially parallel surfaces extending transverse to an axis of the thermometer normal to said dial and to said plate, a hermetic seal for said case comprising gaskets of high temperature resistant, low compression set material positioned between a face of said plate adjacent the peripheral edge thereof and one of said surfaces of said peripheral rim portion of said case, clamping and safety means comprising a bezel and a member of spring material for compressing said gaskets and drawing said plate and case into hermetic sealing engagement therewith and to permit release of pressure within said case above a predetermined value, said bezel having a portion formed over into clamping engagement with the outer face of said plate and a portion underlying the other of said surfaces of said peripheral rim portion of said case, said spring member having the configuration of a transverse section of a conical surface positioned so as to underlie and with the inner edge thereof in engagement with said other surface of said peripheral rim portion of said case, said underlying portion of said bezel being formed over about the outer edge of said spring member into clamping engagement with the under side thereof.

References Cited in the file of this patent

UNITED STATES PATENTS

| | | |
|---|---|---|
| 1,416,794 | Cutler | May 23, 1922 |
| 1,530,067 | Young | Mar. 17, 1925 |
| 1,669,685 | Weber | May 15, 1928 |
| 1,797,004 | Leveen | Mar. 17, 1931 |
| 2,019,221 | Hastings | Oct. 29, 1935 |
| 2,034,852 | Wilhjelm | Mar. 24, 1936 |
| 2,154,426 | Adams | Apr. 19, 1939 |
| 2,276,178 | Ford | Mar. 10, 1942 |
| 2,335,063 | Hopkins | Nov. 23, 1943 |
| 2,347,129 | Salit | Apr. 18, 1944 |
| 2,379,861 | Browne et al. | July 10, 1945 |
| 2,473,581 | Ford | June 21, 1949 |
| 2,558,743 | Ford | July 3, 1951 |
| 2,572,059 | Schlaich | Oct. 23, 1951 |

FOREIGN PATENTS

| | | |
|---|---|---|
| 523,891 | Germany | Apr. 29, 1931 |